Figure 1A:
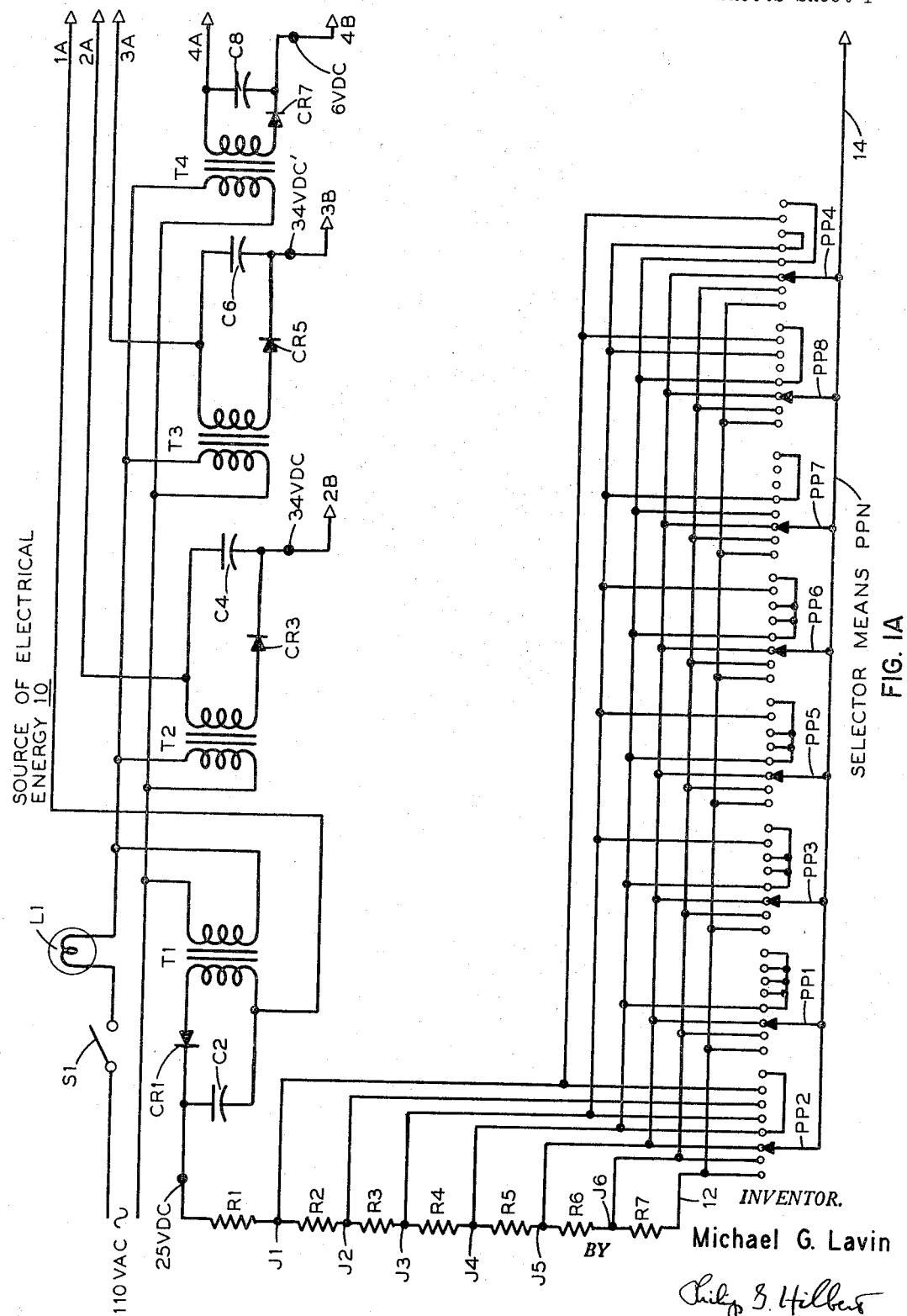

INVENTOR.
Michael G. Lavin
ATTORNEY

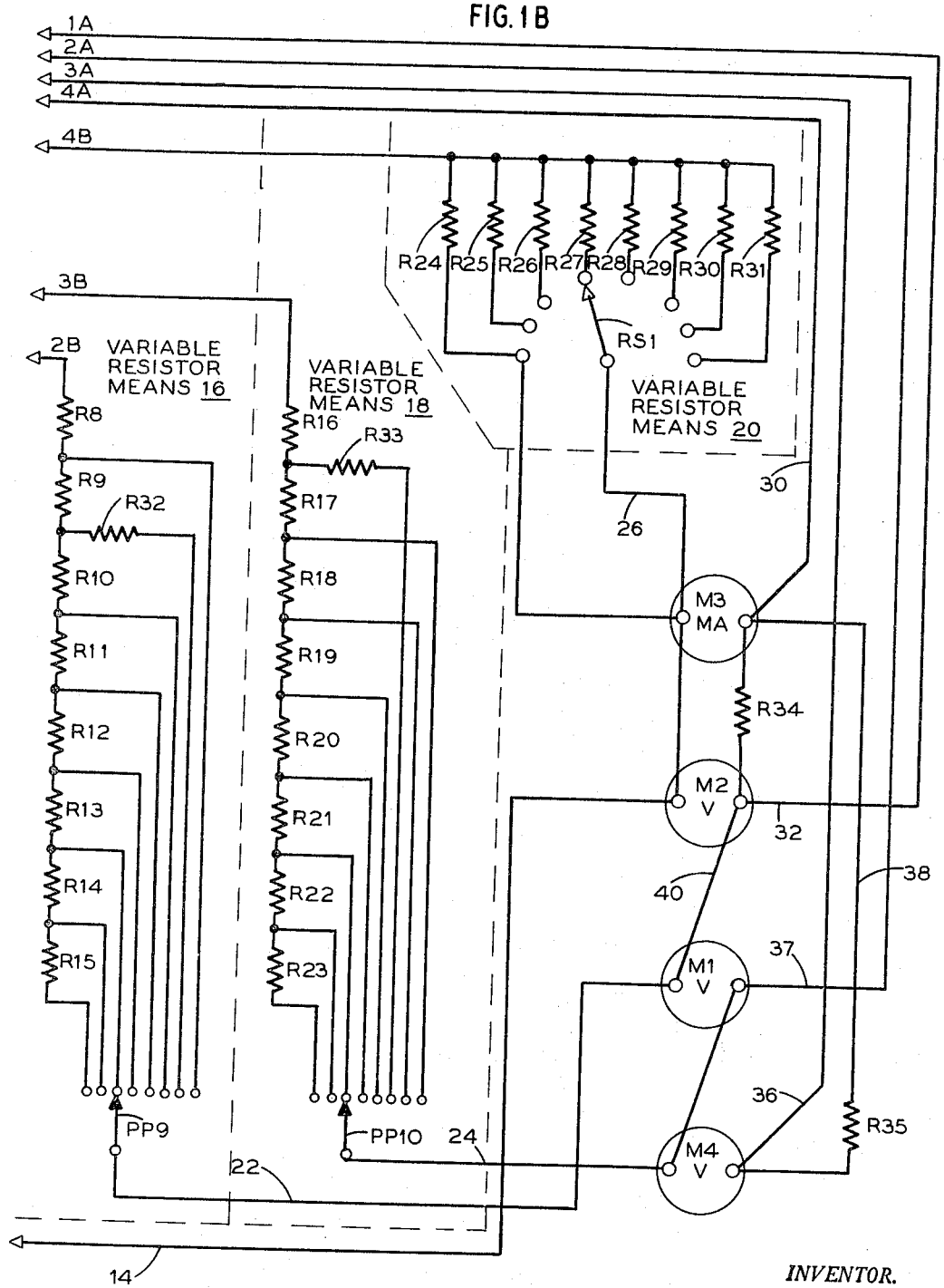

3,316,395
CREDIT RISK COMPUTER
Michael G. Lavin, Woodside, N.Y., assignor to Computer Credit Corporation, a corporation of New York
Filed May 23, 1963, Ser. No. 282,646
7 Claims. (Cl. 235—185)

This invention pertains to computers and more particularly credit risk computers employing sources of electrical energy, electrical circuit elements and electrosensitive indicating means to perform and display the computations.

Although electronic devices have been employed for innumerable types of computations, the evaluation of credit risk is still being performed by skilled personnel using complicated formulae and, essentially, longhand computations.

It is accordingly a general object of the invention to provide an automatic computer that may be employed by a semi-skilled operator to evaluate credit risk directly from the variables required to determine the risk, as they are entered into the computer.

In evaluating credit risk, the following factors are normally considered: the length of time the potential borrower has been in business; how he pays his bills; his current sales; his net worth; his financial condition; his trend of operation; his management record and experience; his profit and loss history; his banking record; the amount of credit requested; and, if a foreign borrower, the politico-economic climate of his home country. Each of these factors varies over a considerable range and many have different weights or influences in determining the ultimate risk. Heretofore, it has been necessary to perform the aforementioned complicated computations to obtain an assessment of the credit risk. Such assessment is expressed as the financial strength of the borrower, composite credit appraisal and the terms of credit to be extended.

It is accordingly another object of the invention to provide an improved computer for indicating the financial strength, composite credit appraisal and credit terms to be extended to a borrower, when certain basic factors are known.

It is a further object of the invention to provide such an improved computer, which is relatively inexpensive to manufacture and maintain, and accordingly is reasonably within the means of the average lending institution or business firm.

Briefly, the invention contemplates a computer that is distinguished by circuitry including a plurality of serially connected impedors. One end of the series is connected to one terminal of a source of electrical energy. The other end of the series and each of the impedor junctions is connected to an output line. A plurality of selector means is also provided. Each of the selector means has a common output terminal and a plurality of input terminals, each connected to one of the output lines of the serially connected impedors. The common terminals of the selector means are connected together and to the input terminal of an electrosensitive indicating means. The output terminal of the indicating means is connected to another terminal of the source of electrical energy.

Accordingly, each of the selector means is associated with a different factor entering into the credit risk evaluation. By manually positioning the common terminal of a selector means to contact one of its input terminals, the specific value of the factor is entered into the computer. The net result of the values of factors is then displayed by the electrosensitive indicating means.

Various features of the invention are concerned with mathematical operations such as for example, subtracting, dividing or otherwise treating certain factors that must be taken into account negatively, and for introducing other factors that may vary the terms of credit based, for example, on the amount of credit desired vis-a-vis the actual appraisal of the borrower's financial strength.

Other objects, features and advantages of the invention will be apparent from the following detailed description when read with the accompanying drawing which schematically shows a credit computer in accordance with the invention.

FIG. 1A is one portion of a circuit diagram of the credit computer embodying the invention; and FIG. 1B is the other portion of said circuit diagram.

Referring to the drawing, there is shown a credit computer that includes a source of electrical energy 10 having a first output line 25VDC connected to the free end of the serially connected impedors, or resistors R1 to R7 inclusive. The junctions J1 to J6 inclusive and the other free end 12 of these serially connected resistors are connected to various input terminals of the selector means generally indicated as PPN. The common terminals of these selector means are connected together to a common output line 14 which feeds one terminal of meter M2. Another output terminal 34VDC of source of electrical energy 10 is connected to the input terminal of variable resistor means 16, whose output terminal is connected via line 22 to one terminal of meter M1. A third output terminal 34VDC' of source of electrical energy 10 is connected to the input terminal of variable resistor means 18 whose output terminal is connected via line 24 to one terminal of meter M4. A fourth output terminal 6VDC of source of electrical energy 10 is connected to the input of variable resistor means 20 whose output is connected via line 26 to one terminal of meter M3. The other terminal of meter M3 is connected via line 30 to a return terminal of source of electrical energy 10. Similarly, the other terminal of meter M2 is connected via line 32 to a return terminal of source of electrical energy 10. Likewise, the other terminals of meters M1 and M4 are connected respectively via the lines 37 and 36 to return terminals of source of electrical energy 10.

The serially connected resistors R1 to R7 cooperate with the various selector means PP1 to PP8 inclusive to provide a current on line 14 which is proportioned to various factors entering into the credit risk evaluation. For example, the selector means PP1 is related to the years the potential borrower has been established in business. The selector means PP2 is associated with the payment experience of the potential borrower. The selector means PP3 is associated with his sales. The selector means PP4 is associated with his banking experience, and so on. Variable resistor means 16 transmits a current which is related to the worth or capital of the borrower via line 22 to meter M1. The variable resistor means 18 is associated with the amount of credit requested by the borrower and feeds a current related thereto to meter M4. The variable resistor means 20 feeds a current which is proportional to political factors via line 26 or meter M3. These factors are determined by the politico-economic climate in the borrower's country. It should be noted that the voltage developed across meter M2 is fed to meter M3 so that the credit appraisal of the borrower, which is basically a function of the factors determined by selector means PPN, is introduced into meter M3, which gives an indication of the terms of credit. However, it should be noted that the voltage developed across meter M2 is modified by the current from variable resistor means 16, which current is associated with the borrower's worth or capital. In particular, the current in line 22 is also fed from a terminal of meter M1 to the second terminal of meter M2 to provide this modification. Similarly, a portion of the current representing the credit requested; that is, a portion of the current on line 24, is fed from a second terminal of meter M4 to a second terminal of meter M3 to influence the type of credit to extend, which is not only a function of the borrower's credit appraisal but also the amount of credit requested by the borrower.

The operation of the system will now be described. In evaluating the credit risk, an operator first considers the number of years that the client has been established in business and positions the common contact of selector means PP1 to the appropriate fixed contact. On the basis of the client's past payment experience, the operator then positions the common contact of selector PP2 in contact with its appropriate fixed contact related to such payment experience of the client. The several fixed contacts of PP2 signify payments that are prompt, generally slow, and other variations of payment experience; or that the trade is unfamiliar with the account. The selector means PP3 is adjusted to reflect the client's sales record in trend characteristics; such as, up sharply, increasing up slightly, steady, off slightly, etc. The selector means PP5 is associated with the financial condition of the client and particularly concerns whether it is sound, satisfactory, normal, fair, heavy or undetermined. The operator then selects the appropriate fixed contact of selector means PP6 on the basis of the client's operating trend, expressed typically as: progressive, steady, turned downward, etc. The selector means PP7 is then adjusted in accordance with the borrower's management record and experience, expressed in trade parlance. The selector means PP8 is associated with the client's profit and loss picture, as for example: profits increasing and retained, profits declining, operating on break even basis, losses incurred, losses increasing, etc. The selector means PP4 is associated with the client's banking record which may range from a good account over many active years, bills attended with delays, and to an account which is unfamiliar to banks. The sum total of the respective settings of PPN develops a voltage on line 14 which is fed to one terminal of meter M2. The operator then adjusts variable resistor means 16 in relation to the worth or capital of the borrower and a voltage in accordance therewith is fed via line 22 to one terminal of meter M1 and via line 40 to the second terminal of meter M2. Thus, the voltage developed across meter M2 represents the first eight factors introduced by selector means PPN modified by the voltage introduced by variable resistor means 16. Meter M2 is calibrated to show the actual credit appraisal of the potential borrower in terms such as excellent, good, fair, limited. The operator then adjusts variable resistor means 18 which develops a voltage across meter M4 that is related to the credit requested by the borrower and expressed in dollars. It should be noted that the second terminal of meter M4 is connected via resistor 35 to the second terminal of meter M3. Finally, the operator adjusts variable resistor means 20 to feed a current related to the politico-economic condition of the borrower's country via line 26 to an input terminal of meter M3. Meter M3 therefore receives from line 26 a current reflecting, in effect, the politico-economic climate, as well as a current proportional to the credit appraisal. However, the terminal connected to line 30 receives a current from meter M4 that is proportional to the credit requested. Therefore, meter M3 gives an indication reflecting inversely the sum of the credit appraisal and the politico-economic condition less the credit requested. Meter M3 is calibrated to indicate the terms of credit to be advanced, which may be expressed as: open account, drafts or letter of credit, and other appropriate terms used in credit evaluation. It follows that the greater the credit requested, the greater the current flowing through meter M3 and the more stringent the indicated terms of credit. In this manner, the interaction of 11 factors are reflected as an overall credit appraisal of the client, indicated by meter M2, and the terms of credit to be extended are indicated by meter M3.

*Description of the elements of the computer*

The source of electrical energy 10 includes four sources of potential. The first source of potential includes the transformer T1, the rectifier CR1 and filter capacitor C2 which yields a 25 volt D.C. output. The second source of potential includes the transformer T2, the rectifier CR3 and the filter capacitor C4 which yields a 34 volt D.C. output. The third source of potential includes the transformer T3, the rectifier CR5 and the filter capacitor C6 which yields a 34 volt D.C. output also; and the fourth source of potential includes the transformer T4, the rectifier CR7 and the filter capacitor C8 which yields a six volt D.C. output. It should be noted that the primaries of the transformers T1 to T4 are connected in parallel via the indicator light L1 and the on-off switch S1 to a conventional 110 volt A.C. line.

Each of the selector means PP1 to PP8 inclusive is a selector switch, a typical device being selector means PP1 which has a common contact and eight fixed contacts. The eight fixed contacts are connected to resistor network R1–R7 so as to pick off various voltages. Since the various weights associated with the selector means PP1 to PP8 are similar for some factors, the arrangement of the serially connected resistors R1 to R7 and the selector means PP1 to PP8 provides an inexpensive and straightforward method of obtaining the weighted outputs for these selector means.

Variable resistor means 16 actually comprises the serially connected resistors R8 to R15 inclusive. The free end of resistor R15 and the junctions between the remaining resistors are connected to fixed contacts of a selector switch PP9 which has a common contact connected to line 22. Similarly, variable resistor means 18 includes the serially connected resistors R16 to R23 inclusive wherein the free end of resistor R23 is connected to one fixed contact and the junctions of these resistors connected respectively to other fixed contacts of the selector switch PP10 which also has a common contact connected to line 24. It should be noted that resistor R33 is included in the path of the junction between resistors R16 and R17 to provide a correction factor. Similarly, the resistor R32 is included in the path of the junction of resistors R9 and R10 to provide a correction factor. Variable resistor means 20 includes the resistors R24 to R31 inclusive. One end of each of these resistors is connected to the line 6VDC. The other ends of these resistors are connected respectively to fixed contacts of selector switch RS1 whose common contact is connected to line 26.

Meter M3 is preferably a milliammeter, whereas the remaining meters M1, M2 and M4 are voltmeters. Resistor R34 provides coupling between meters M2 and M3 while resistor R35 provides coupling between meters M3 and M4. It should be noted that meters M1 and M4 are generally provided for trouble shooting purposes and may be replaced by suitable impedances without affecting the operation of the system.

It should also be noted that while the sources of potential are shown as direct current sources and resistors have been used throughout, it is equally possible to employ alternating current sources and replace the resistors by suitable impedors such as inductors and capacitors and the direct current meters by appropriate alternating current meters.

There has thus been shown an improved calculator which is well suited for handling the usual trade variables and translating the same into evaluated credit risks. While one embodiment of the invention has been shown and described in detail, it will be apparent that modifications and variations thereof may be made which do not depart from the spirit of the invention, and accordingly the disclosure herein shall be deemed illustrative and not limiting except as set forth in the appended claims.

What is claimed is:
1. A calculator comprising:
(a) a first source of electrical energy including first and second terminals;
(b) a first variable resistor means including first and second terminals;
(c) means for connecting the first terminal of said first source to the first terminal of said first variable resistor means;
(d) a second source of electrical energy including first and second terminals;
(e) a second variable resistor means including first and second terminals;
(f) means for connecting the first terminal of said second source to the first terminal of said second variable resistor means;
(g) means for connecting the second terminal of said first source to the second terminal of said second variable resistor means whereby said first variable resistor means, said first source, said second variable resistor means and said second source are connected in a serial array;
(h) a first electrosensitive indicating means having first and second terminals;
(i) means for connecting the first terminal of said first electrosensitive indicating means to the second terminal of said first variable resistor means;
(j) means for connecting the second terminal of said first electrosensitive indicating means to the second terminal of said second source;
(k) a third source of electrical energy including first and second terminals;
(l) a third variable resistor means including first and second terminals;
(m) means for connecting the first terminal of said third source to the first terminal of said third variable resistor means;
(n) means for connecting the second terminal of said third source to the second terminal of said first electrosensitive indicating means; and
(o) means for connecting the second terminal of said third variable resistor means to the first terminal of said first electrosensitive indicating means.

2. The calculator of claim 1 wherein said first variable resistor means comprises a plurality of serially connected resistors, one end of said serially connected resistors being connected to the first terminal of said first source, a plurality of selector switches, each of said selector switches having a plurality of fixed contacts and a movable contact for selectively contacting said fixed contacts, means for connecting the junction of said serially connected resistors to said fixed contacts, and means for connecting said movable contact to the first terminal of said first electrosensitive indicating means.

3. The calculator of calim 1 wherein said third variable resistor means comprises a plurality of resistors, means for connecting one end of each resistor to the first terminal of said third source, a selector switch including a plurality of fixed contacts and a movable contact, means for connecting the other end of each resistor to one of said fixed contacts, respectively, and means for connecting said movable contact to the first terminal of said first electrosensitive indicating means.

4. The calculator of claim 1 and further including a second electrosensitive indicating means connected in parallel with the serial combination of said first source and said first variable resistor means; and a third electrosensitive indicating means being connected in parallel with the serial combination of said second source and said second variable resistor means.

5. The calculator of claim 4 wherein the means connecting the second terminal of said first source to the second terminal of said second variable resistor means comprises a fourth source of electrical energy and a fourth variable resistor means connected in series, and a fourth electrosensitive indicating means connected in parallel thereto.

6. The calculator of claim 5 wherein said first variable resistor means comprises a plurality of serially connected first resistors, one end of said serially connected first resistors being connected to the first terminal of said first source, a plurality of first selector switches, each of said first selector switches having a plurality of fixed contacts and a movable contact for selectively contacting said fixed contacts, means for connecting the junctions of said serially connected first resistors to said fixed contacts, and means for connecting said movable contacts to the first terminal of said first electrosensitive indicating means; and wherein said third variable resistor means comprises a plurality of second resistors, means for connecting one end of each of said second resistors to the first terminal of said third source, a second selector switch including a plurality of fixed contacts and a movable contact, means for connecting the other end of each of said second resistors to one of said fixed contacts, respectively, and means for connecting said movable contact to the first terminal of said first electrosensitive indicating means.

7. A calculator comprising:
(a) a first source of electrical energy including first and second terminals;
(b) a first variable resistor means including first and second terminals;
(c) means for connecting the first terminal of the first source of electrical energy to the first terminal of the first variable resistor means;
(d) a first electrosensitive means including first and second terminals;
(e) means for connecting the first terminal of the first electrosensitive means to the second terminal of the first variable resistor means;
(f) means for connecting the second terminal of the first electrosensitive means to the second terminal of the first source of electrical energy;
(g) a second source of electrical energy including first and second terminals;
(h) a second variable resistor means including first and second terminals;
(i) means for connecting the first terminal of the second source of electrical energy to the first terminal of the second variable resistor means;
(j) a second electrosensitive means including first and second terminals;
(k) means for connecting the first terminal of the second electrosensitive means to the second terminal of the second variable resistor means;
(l) means for connecting the second terminal of the second source of electrical energy to the second terminal of the second electrosensitive means;
(m) means for connecting the first terminal of the first electrosensitive means to the second terminal of the second electrosensitive means;
(n) a third source of electrical energy including first and second terminals;
(o) a third variable resistor means including first and second terminal means;
(p) means for connecting the first terminal of the third source of electrical energy to the first terminal means of the third variable resistor means;
(q) a third electrosensitive means including first and second terminals;
(r) means for connecting the second terminal of the third electrosensitive means to the second terminal of the third source of electrical energy;
(s) a plurality of selector means having a plurality of fixed terminals and a selector terminal;
(t) means for connecting the fixed terminals of said selector means to the second terminal means of the third variable resistor means;
(u) means for connecting the selector terminals of said selector means to the first terminal of the third electrosensitive means;
(v) means for connecting the first terminal of the second electrosensitive means to the second terminal of the third electrosensitive means;
(w) a fourth source of electrical energy including first and second terminals;
(x) a fourth variable resistor means including a plurality of resistors and including first and second terminals for each of the resistors;
(y) means for connecting the first terminals of the resistors to the first terminal of the fourth source of electrical energy;
(z) a further selector means including a plurality of fixed terminals and a selector terminal;
(aa) means for connecting the second terminals of the resistors to the fixed terminals of the further selector means;
(bb) a fourth electrosensitive means including first and second terminals;
(cc) means for connecting the first terminal of the further selector means to the first terminal of the fourth electrosensitive means;
(dd) means for connecting the second terminal of one of the resistors to the first terminal of the fourth electrosensitive means;
(ee) means for connecting the second terminal of the fourth electrosensitive means to the second terminal of the fourth source of electrical energy;
(ff) means for connecting the first terminal of the fourth electrosensitive means to the first terminal of the third electrosensitive means;
(gg) resistor means for connecting the second terminal of the fourth electrosensitive means to the second terminal of the third electrosensitive means; and
(hh) further resistor means for connecting the second terminal of the fourth electrosensitive means to the second terminal of the first electrosensitive means.

References Cited by the Examiner
UNITED STATES PATENTS

| | | | |
|---|---|---|---|
| 3,005,589 | 10/1961 | Harder | 235—185 |
| 3,054,561 | 9/1962 | Hazeltine | 235—182 |
| 3,233,086 | 2/1966 | Schwetman | 235—180 |

MALCOLM A. MORRISON, *Primary Examiner.*

A. J. SARLI, J. RUGGIERO, *Assistant Examiners.*